(12) United States Patent
Murase et al.

(10) Patent No.: US 9,727,171 B2
(45) Date of Patent: Aug. 8, 2017

(54) INPUT APPARATUS AND FINGERTIP POSITION DETECTION METHOD

(71) Applicant: FUJITSU LIMITED, Kawasaki-shi, Kanagawa (JP)

(72) Inventors: Taichi Murase, Kawasaki (JP); Takahiro Matsuda, Isehara (JP); Kazuki Osamura, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 15/075,068

(22) Filed: Mar. 18, 2016

(65) Prior Publication Data

US 2016/0274691 A1    Sep. 22, 2016

(30) Foreign Application Priority Data

Mar. 19, 2015   (JP) ................................. 2015-056661

(51) Int. Cl.
*G09G 5/00* (2006.01)
*G06F 3/042* (2006.01)
*G06K 9/00* (2006.01)

(52) U.S. Cl.
CPC .......... *G06F 3/042* (2013.01); *G06K 9/00375* (2013.01)

(58) Field of Classification Search
CPC .......... G06F 3/005; G06F 3/011; G06F 3/017; G06T 19/006
USPC .......................................... 345/156; 382/103
See application file for complete search history.

(56) References Cited

U.S. PATENT DOCUMENTS

| 2014/0306875 A1* | 10/2014 | He | G06F 3/017 345/156 |
| 2015/0077323 A1* | 3/2015 | Ramaswamy | G06F 3/012 345/156 |
| 2016/0239080 A1* | 8/2016 | Marcolina | G06F 3/011 |

FOREIGN PATENT DOCUMENTS

| JP | 2001-005973 | 1/2001 |
| JP | 2005-069734 | 3/2005 |
| JP | 2011-175347 | 9/2011 |

* cited by examiner

*Primary Examiner* — Calvin C Ma
(74) *Attorney, Agent, or Firm* — Fujitsu Patent Center

(57) ABSTRACT

An input apparatus includes a processor which is configured to: detect a finger region containing a finger and a fingertip position in a first image captured by a first camera; set a template containing the finger region and generate a plurality of sub-templates by dividing the template along a longitudinal direction of the finger region; obtain a region that best matches the template on a second image generated by a second camera placed a prescribed distance away from the first camera and divide the region into search regions equal in number to the sub-templates along the longitudinal direction of the finger region; perform template matching between a sub-template containing the fingertip position and a corresponding search region to find a matching point corresponding to the fingertip position; and compute the fingertip position in real space based on the fingertip position and the matching point.

11 Claims, 10 Drawing Sheets

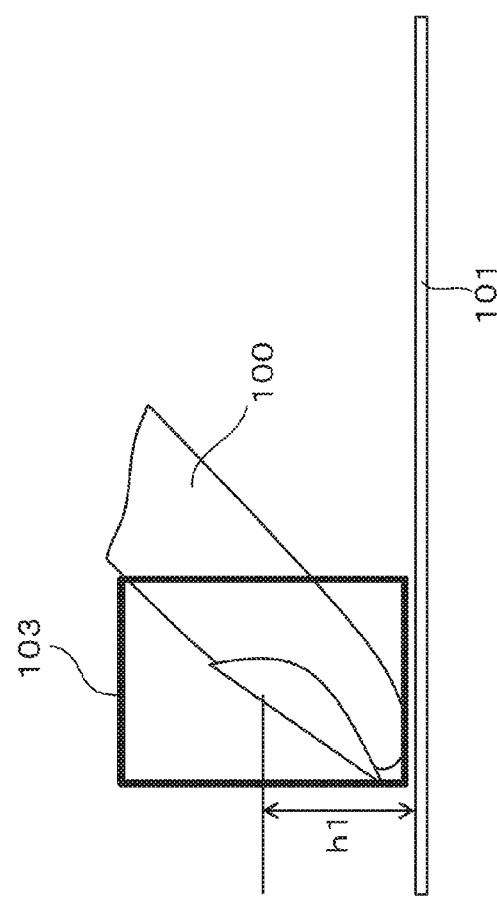
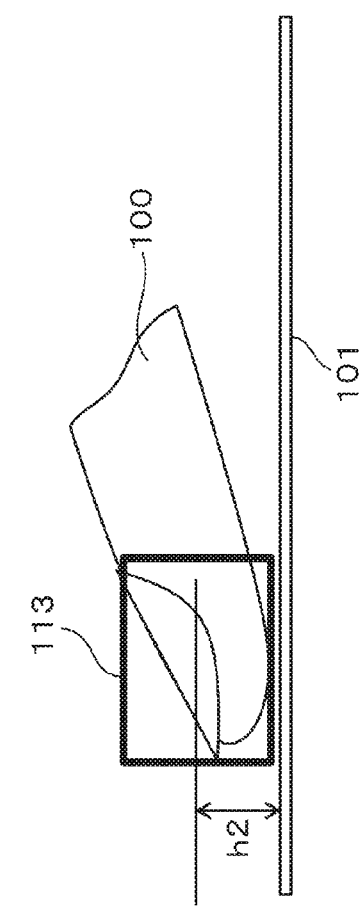
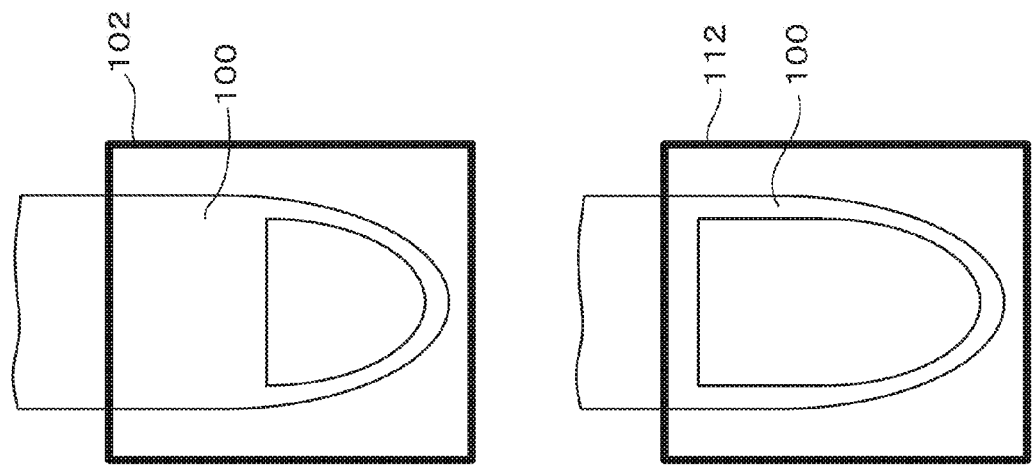
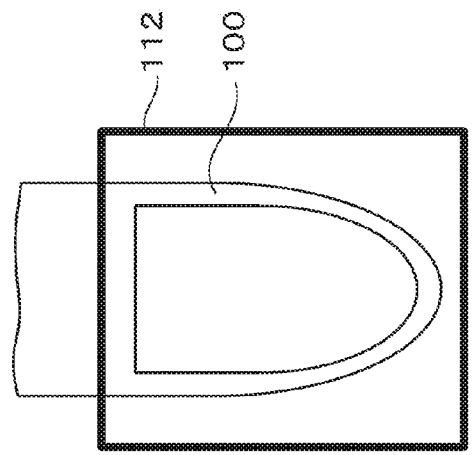
FIG. 1A
FIG. 1B

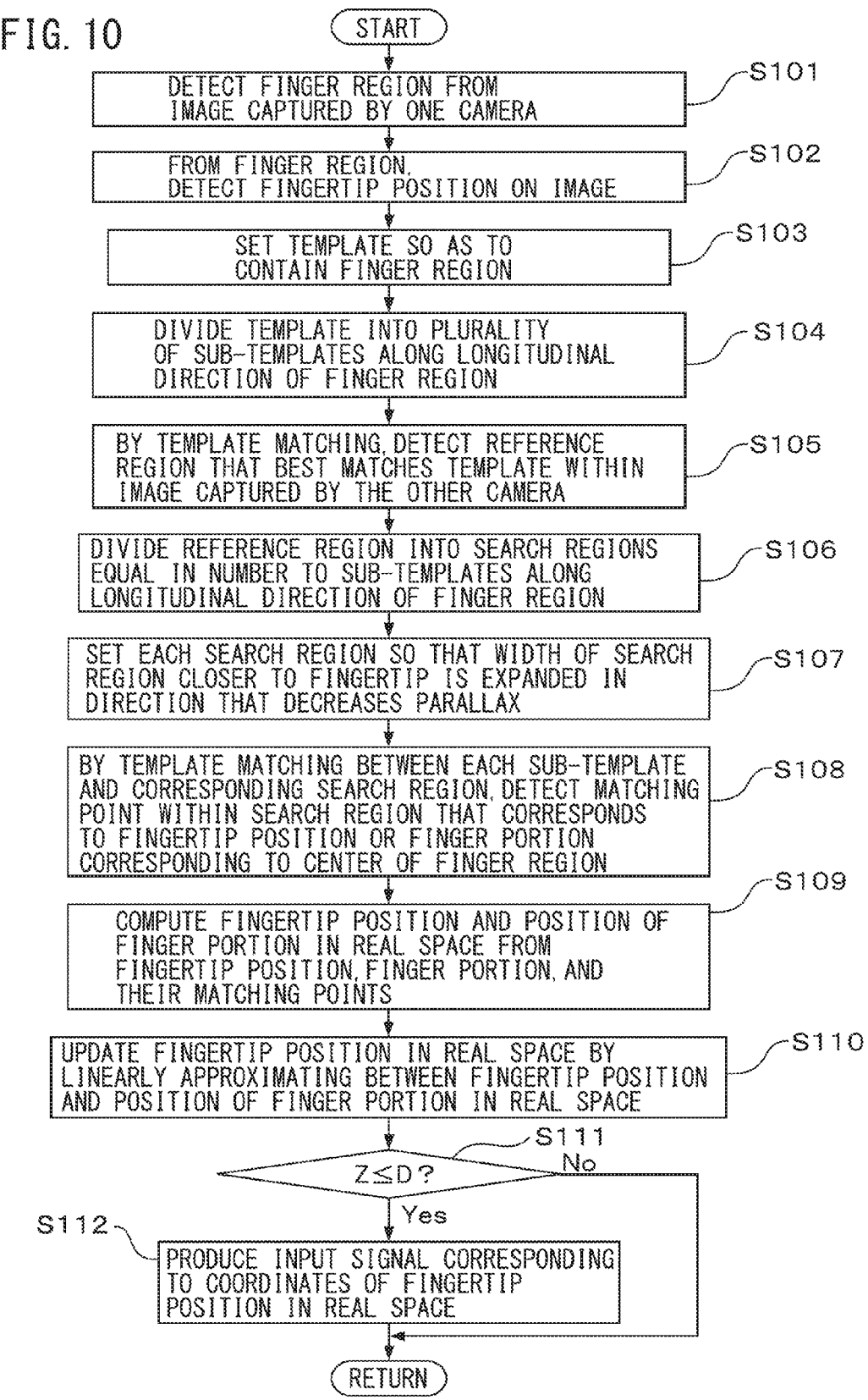

INPUT APPARATUS AND FINGERTIP POSITION DETECTION METHOD

CROSS-REFERENCE TO RELATED APPLICATION

This application is based upon and claims the benefit of priority of the prior Japanese Patent Application No. 2015-056661, filed on Mar. 19, 2015, the entire contents of which are incorporated herein by reference.

FIELD

The embodiments discussed herein are related to an input apparatus that produces an input signal corresponding to the position of a fingertip captured in an image, and also related to a fingertip position detection method for use with such an input apparatus.

BACKGROUND

Research on a type of user interface that detects human motion and produces an input signal corresponding to the motion has been proceeding in recent years. The feasibility of applying such a user interface to an information terminal such as a personal computer or a smart phone, for example, is also being investigated. In particular, when applying this type of user interface to operate a personal computer or the like used in an office, the problem is that it is difficult for the user to perform an operation involving a large gesture. There is therefore a need for a user interface that can recognize subtle gestures made with hands or fingers or the like. However, if subtle gestures made with hands or fingers or the like are to be recognized, a high degree of detection accuracy is demanded of the user interface.

In view of the above, there is proposed a technique for recognizing a gesture or the like by capturing left and right parallax images with a predetermined angle of parallax using a stereoscopic camera and by determining, based on the images, the parallax value for an object contained in the captured images (for example, refer to Japanese Laid-open Patent Publication No. 2011-175347).

The information processing apparatus disclosed in Japanese Laid-open Patent Publication No. 2011-175347 converts one parallax image into a grayscale image having two or more levels, and extracts an object from the grayscale image by detecting a group of contiguous pixels having the same level and contiguous in a predetermined direction. Then, for each extracted object, based on the position of the object and a predetermined maximum allowable parallax, the information processing apparatus sets a reference region in the one parallax image and a search area in the other parallax image. Then, using the image of the reference region as a template, the information processing apparatus performs template matching within the search area to search for a region similar to the reference region, and determines the parallax value for the object based on the positional displacement between the reference region and the similar region.

SUMMARY

However, in the above technique, when computing the parallax between the cameras by template matching, since the parallax value for the object as a whole is computed, the distance obtained based on the parallax value represents the average distance from the cameras to the object as a whole. Accordingly, in applications where an input signal is produced, not based on the object as a whole, but based on a portion of the object, for example, the position of a fingertip, the technique that can only obtain an average distance for the object as a whole has the disadvantage of being unable to provide sufficient position detection accuracy.

According to one embodiment, an input apparatus is provided. The input apparatus including: a first camera which captures a finger and generates a first image representing the finger; a second camera which is placed a prescribed distance away from the first camera, and which captures the finger and generates a second image representing the finger; a finger region detection unit which detects, from the first image, a finger region containing the finger and detects, from the finger region, a fingertip position corresponding to a fingertip of the finger; a template setting unit which sets a template containing the finger region and generates a plurality of sub-templates by dividing the template along a longitudinal direction of the finger region; a search region setting unit which obtains a region that best matches the template on the second image, and which divides the region into search regions equal in number to the sub-templates along the longitudinal direction of the finger region; a matching unit which performs template matching between a sub-template selected from among the plurality of sub-templates as containing the fingertip position and a corresponding one of the search regions to find a matching point on the second image that corresponds to the fingertip position on the first image; and a fingertip position computing unit which computes the position of the fingertip of the finger in real space, based on the fingertip position on the first image and the matching point on the second image.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 1A is a diagram illustrating one example of how a finger is tilted with respect to an object.

FIG. 1B is a diagram illustrating one example of how a finger is tilted with respect to an object.

FIG. 10 is an operation flowchart illustrating an input process incorporating a fingertip position detection process.

DESCRIPTION OF EMBODIMENTS

Figure 2:
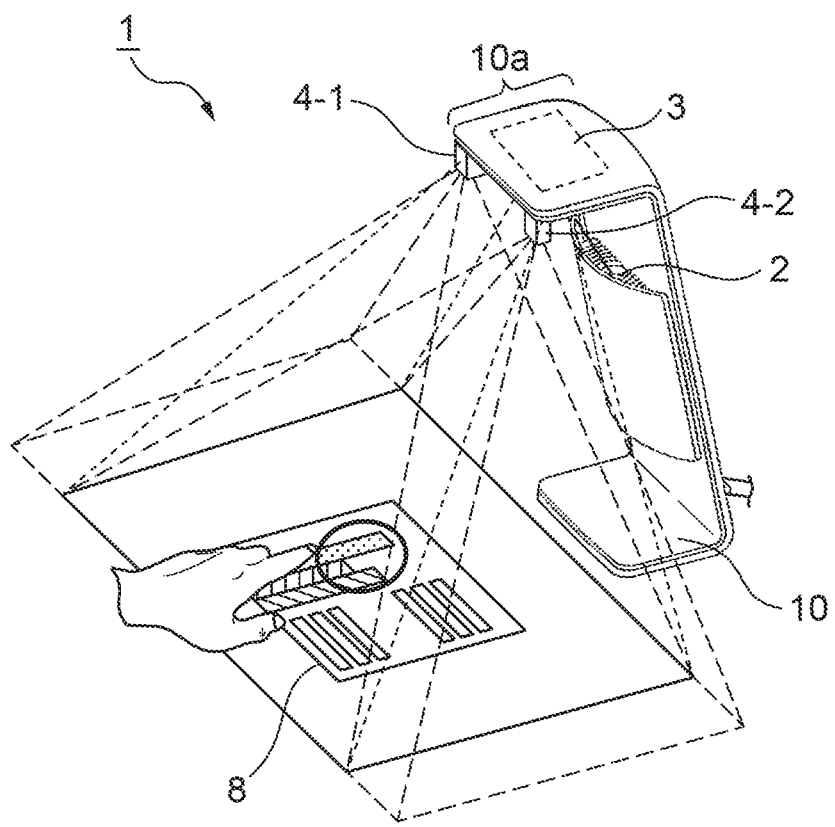
FIG. 2 is a schematic perspective view illustrating one configuration example of an input apparatus according to one embodiment.

An input apparatus will be described below with reference to the drawings. The input apparatus obtains the position of a user's fingertip in real space from two images captured of the fingertip by using two cameras and, based on the position thus obtained, determines whether or not the fingertip has touched an object that serves as a reference. When it is determined that the fingertip has touched the object, the input apparatus produces an input signal corresponding to the position of the fingertip.

The way of tilting the finger with respect to the object may differ from user to user. FIGS. 1A and 1B are diagrams each illustrating one example of how the finger is tilted with respect to the object. In the example of FIG. 1A, the finger 100 is tilted with a relatively large angle with respect to the object 101. It is assumed that, for example, a template 102 for template matching is set in one image so as to contain a portion 103 of the finger 100 other than the fingertip portion. In this case, the height of the finger 100 above the object 101, computed from the positions corresponding between the template 102 and the other image, is the average height h1 of the portion 103 of the finger 100 contained in the template 102, and thus the error with respect to the actual height of the fingertip above the object 101 becomes large.

On the other hand, in the example of FIG. 1B, the tilting of the finger 100 with respect to the object 101 is relatively small. As a result, when a template 112 is set so as to contain a portion 113 of the finger 100 other than the fingertip portion, the height h2 of the finger 100 above the object 101 is computed as the average height h2 of the finger portion 113, and this height h2 is smaller than the height h1 presented in the example of FIG. 1A. In this way, the longer the finger portion contained in the template, the more likely the error in the height of the fingertip above the object due to the tilting of the finger with respect to the object is to increase.

In view of the above, the input apparatus detects a finger region containing the finger from one image, and divides the template containing the finger-containing region into a plurality of sub-templates along the longitudinal direction of the finger in the image. Then, for each sub-template, the input apparatus performs template matching within a search region that is set in the other image for the sub-template, and finds a matching point for the finger portion contained in the sub-template. Then, based on the finger portions contained in the respective sub-templates in the one image and their matching points in the other image, the input apparatus obtains the position of the fingertip in real space. The input apparatus thus enhances the detection accuracy of the position of the fingertip in real space.

Figure 3:
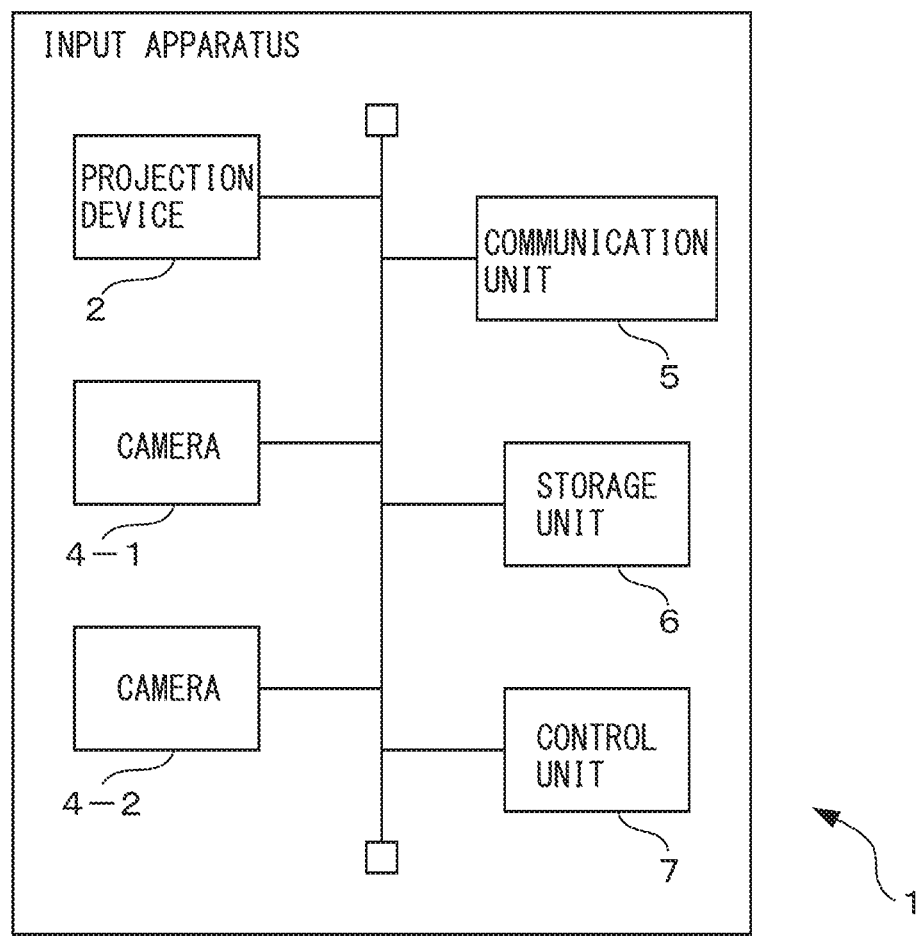
FIG. 3 is a hardware block diagram of the input apparatus illustrated in FIG. 2.

FIG. 2 is a schematic perspective view of the input apparatus according to one embodiment. FIG. 3 is a hardware block diagram of the input apparatus illustrated in FIG. 2. The input apparatus 1 includes a projection device 2, a mirror 3, two cameras 4-1 and 4-2, a communication unit 5, a storage unit 6, and a control unit 7. These units constituting the input apparatus 1 are contained in a housing 10 which has a U-shape with its bottom upright when viewed from the lateral side thereof. For convenience of explanation, the side facing the user will hereinafter be referred to as the front.

The projection device 2 is, for example, a liquid-crystal projector, and is mounted in the front of the housing 10 with the display surface facing upward. The projection device 2 projects a video image by displaying the image on its display surface in accordance with a video signal received from the control unit 7. The video image projected from the projection device 2 is reflected by the mirror 3 mounted on the bottom side of a top portion 10a of the housing 10, the top portion 10a being formed so as to project toward the front side, and is projected, for example, onto a table surface on which an object 8 used to determine whether or not the user's fingertip has touched it, is placed. The object 8 may be, for example, a sheet-like object, but need not be limited to such an object. Further, the object 8 may be the table itself on which the input apparatus 1 is placed.

The two cameras 4-1 and 4-2 are one example of an image capturing unit, and are mounted on the top portion 10a so as to point directly downward and in such a manner that one is separated from the other by a prescribed distance across the mirror 3. The height from the table surface to the cameras 4-1 and 4-2 is set, for example, to 600 mm so that the object 8 is contained within the image capturing range of both of the cameras 4-1 and 4-2 and so that the fingertip positioned near the object 8 can be identified on an image. The cameras 4-1 and 4-2 generate images captured within their respective image capturing ranges at predetermined intervals of time (for example, every 10 msec to 50 msec). In the present embodiment, the images generated by the cameras 4-1 and 4-2 are color images whose colors are described by the RGB color system. Further, in the present embodiment, the direction of the parallax between the two cameras 4-1 and 4-2 is the horizontal direction in the images generated by the respective cameras. Each time the cameras 4-1 and 4-2 generate images, the images are supplied to the control unit 7.

The communication unit 5 includes an interface for connecting the input apparatus 1 to another apparatus, and a control circuit for the interface. For example, the communication unit 5 receives a video signal from another apparatus, and passes it to the control unit 7. Further, the communication unit 5 receives a user input signal from the control unit 7, and transmits it to another apparatus.

The storage unit 6 includes, for example, a volatile or nonvolatile semiconductor memory. The storage unit 6 stores a video signal representing the video image to be projected by the projection device 2 and various kinds of information to be used for detecting user input operations. The information to be used for detecting user input operations includes, for example, various kinds of parameters used to detect the spacing between the cameras 4-1 and 4-2, the focal lengths of the cameras 4-1 and 4-2, and the position of the fingertip. The information to be used for detecting user input operations may further include the distance from the camera 4-1 or 4-2 to the surface of the object 8 for each position on the surface parallel to the table. The storage unit 6 may further store an image obtained from the camera 4-1 or 4-2.

The control unit 7 includes one or a plurality of processors and their peripheral circuitry. The control unit 7 is connected to the projection device 2, the cameras 4-1 and 4-2, the communication unit 5, and the storage unit 6 via signal lines, and controls the entire operation of the input apparatus 1.

The control unit 7 identifies the position of the user's fingertip in real space (i.e., the three-dimensional position) by obtaining the fingertip positions in the images received from the respective cameras 4-1 and 4-2. Then, based on the fingertip position in real space, the control unit 7 determines whether the user has performed an input operation; when it is determined that an input operation has been performed, the control unit 7 produces an input signal corresponding to the fingertip position and performs processing appropriate to the input signal.

Elements related to an input process, including a fingertip position detection process, that is performed by the control unit 7 will be described in detail below.

Figure 4:
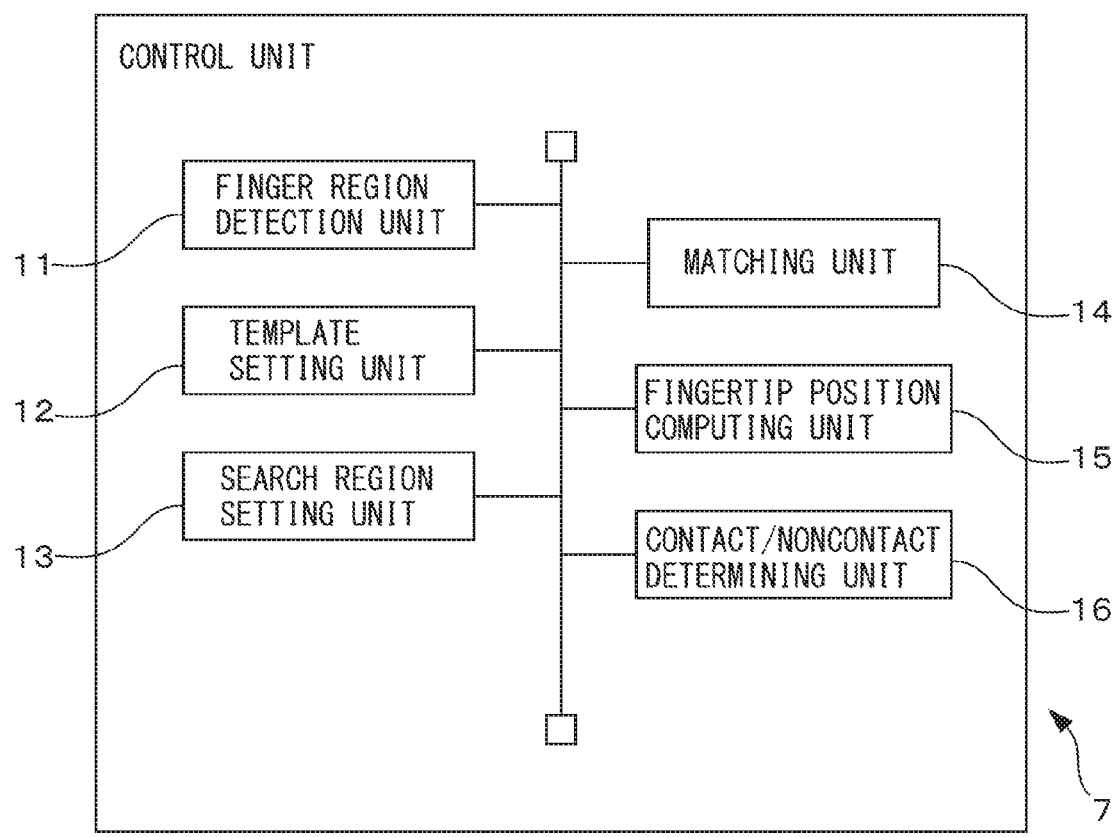
FIG. 4 is a functional block diagram of a control unit.

FIG. 4 is a functional block diagram of the control unit 7. The control unit 7 includes a finger region detection unit 11, a template setting unit 12, a search region setting unit 13, a matching unit 14, a fingertip position computing unit 15, and a contact/noncontact determining unit 16. These units constituting the control unit 7 may be implemented, for example, as functional modules by a computer program executed on a processor incorporated in the control unit 7. Alternatively, these units may be mounted as separate circuits in the input apparatus 1 separately from the control unit 7, or may be mounted in the input apparatus 1 separately from the control unit 7 in the form of a single integrated circuit that implements the functions of the respective units.

Each time the control unit 7 acquires images from the respective cameras 4-1 and 4-2, the finger region detection unit 11 detects a finger region, a region containing a finger, in the image acquired from one or other of the cameras. In the following description, it is assumed that the finger region detection unit 11 detects the finger region in the image acquired from the camera 4-1.

In the present embodiment, the finger region detection unit 11 extracts as the finger region a region having colors corresponding to flesh-tone colors in the image. For this purpose, the finger region detection unit 11 converts the value of each pixel in the image from a value defined in the RGB color system to a value defined in the HSV color system in accordance with the following equation.

$$V = \text{MAX}(R, G, B) \quad (1)$$

$$S = 255 \times \frac{\text{MAX}(R, G, B) - \text{MIN}(R, G, B)}{\text{MAX}(R, G, B)}$$

$$H =$$

$$60 \times \left( \frac{B - G}{\text{MAX}(R, G, B) - \text{MIN}(R, G, B)} \right) \text{ (when } R = \text{MAX}(R, G, B))$$

$$H = 60 \times \left( 2 + \frac{R - B}{\text{MAX}(R, G, B) - \text{MIN}(R, G, B)} \right)$$

$$\text{(when } G = \text{MAX}(R, G, B))$$

$$H = 60 \times \left( 4 + \frac{G - R}{\text{MAX}(R, G, B) - \text{MIN}(R, G, B)} \right)$$

$$\text{(when } B = \text{MAX}(R, G, B))$$

where R, G, and B represent respectively the red, green, and blue components of the pixel before conversion. MAX and MIN represent respectively the maximum value and minimum value of the red, green, and blue components of the pixel before conversion. H, V, and S represent respectively the hue, lightness, and saturation of the pixel after conversion. When the value of H obtained from the equation (1) is negative, 360 is added to the value to yield the hue value. In the illustrated example, the lightness V and the saturation S each take a value in the range of 0 to 255. On the other hand, the hue H takes a value in the range of 0 to 359.

The finger region detection unit 11 extracts the pixels satisfying the following conditions as the pixels having flesh-tone colors from the image whose pixel values are defined in the HSV color system.

$$0.11 < 2\pi \frac{H}{360} < 0.22 \quad (2)$$

$$0.2 < \frac{S}{255} < 0.5$$

The finger region detection unit 11 performs labeling on the extracted pixels having flesh-tone colors (for convenience, hereinafter referred to as the flesh-tone pixels), and detects the finger region formed by connecting the flesh-tone pixels. The finger region detection unit 11 may detect the finger region in accordance any one of various known methods for detecting a finger region from an image.

When the finger region is detected, the finger region detection unit 11 detects the fingertip position on the image by detecting the distal end of the finger region. For example, when it is assumed that the base of the finger is located in the upper part of the image and the fingertip in the lower part, the finger region detection unit 11 determines that, among the pixels located on the contour of the finger region, the pixel located at the lowest vertical coordinate position represents the fingertip position. Alternatively, the finger region detection unit 11 may detect the fingertip position on the image in accordance with any one of various known methods for detecting a fingertip position on an image, for example, in accordance with a method disclosed in Japanese Laid-open Patent Publication No. 2003-346162.

The finger region detection unit 11 reports the finger region and the fingertip position detected on the image to the template setting unit 12. Further, the finger region detection unit 11 reports the fingertip position detected on the image to the fingertip position computing unit 15.

For the image on which the finger region and the fingertip position have been detected, the template setting unit 12 sets a template and sub-templates to be used for matching against the other image. More specifically, the template setting unit 12 sets the template so as to contain at least a portion of the finger region as well as the fingertip position, and divides the template into a plurality of sub-templates along the longitudinal direction of the finger.

In the present embodiment, the template setting unit 12 sets the template by reference to the fingertip position. In the present embodiment, it is assumed that the base of the finger is located in the upper part of the image and the fingertip in the lower part and also that the finger captured in the image is substantially parallel to the vertical direction of the image.

Figure 5:
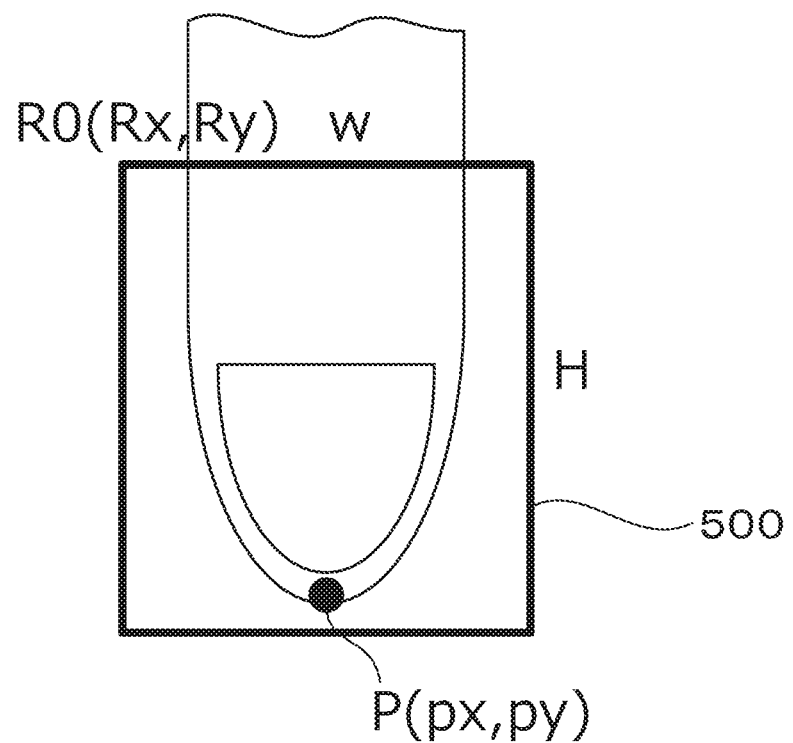
FIG. 5 is a diagram illustrating one example of a template.

FIG. 5 is a diagram illustrating one example of the template. The template 500 is, for example, set so that a designated portion of the finger 501, for example, the portion forward of the end joint of the finger, is contained in the template 500. For example, when the coordinates of the fingertip position P on the image are (px, py), the coordinates R0 (rx, ry) of the upper left corner of the template 500 are given as follows.

$$rx = px - W/2$$

$$ry = y - H$$

where W is the horizontal length of the template 500, and H is the vertical length of the template 500. When the distance from the camera 4-1 to the finger is approximately 600 mm, and when the camera 4-1 has a VGA resolution (640×480 pixels) and an angle of view of 75°, W and H are both set, for example, equal to 40.

The template setting unit 12 generates the sub-templates by dividing the template into a plurality of regions along the longitudinal direction of the finger.

Figure 6:
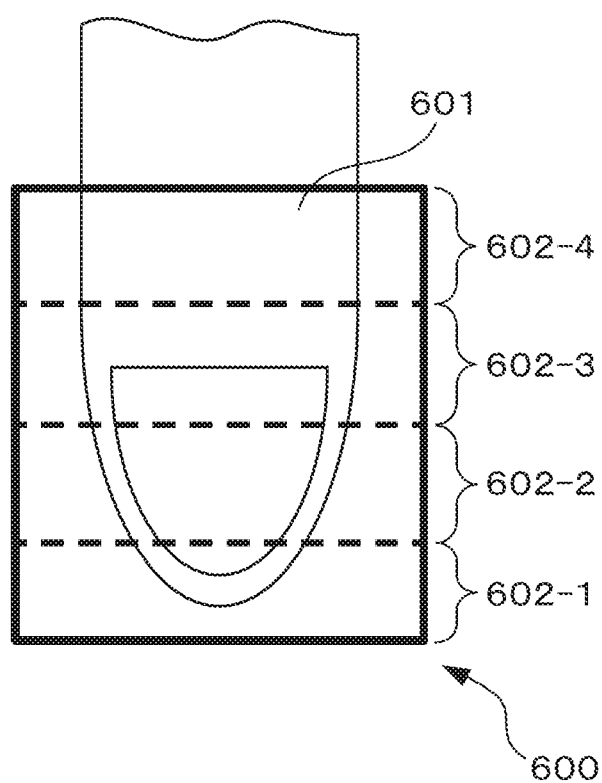
FIG. 6 is a diagram illustrating one example of how sub-templates are generated from the template of FIG. 5.

FIG. 6 is a diagram illustrating one example of how the sub-templates are generated from the template of FIG. 5. The template 600 is equally divided into a number N (N=4 in this example) of sub-templates 602-1 to 602-4 along the longitudinal direction of the finger region 601. Each sub-template therefore contains a portion of the finger region. The number N by which the template is divided is set to a larger number as the allowable error range for the height of the fingertip position becomes smaller or as the vertical length H of the template increases.

There are certain cases in which the longitudinal direction of the finger captured in the image is not limited to a particular direction. In such cases, the template setting unit 12, for example, first applies an affine transformation to the image so that the longitudinal direction of the finger region becomes the vertical direction, and then sets the template and sub-templates as described above. In this case, the template setting unit 12, for example, obtains a first position which is located a predetermined number of pixels (for example, 10 to 20 pixels) away from the fingertip position along one side of the contour of the finger region, and a second position which is located the predetermined number of pixels away from the fingertip position along the other side of the contour of the finger region. Then, the template setting unit 12 determines that the direction in which the line joining the fingertip position to the midpoint between the first and second positions extends represents the longitudinal direction of the finger.

The template setting unit 12 may replace the value of every pixel within the template, except the pixels inside the finger region, by a predetermined value (for example, 0) in order to reduce the effects that the values of the pixels located within the template but outside the finger region can have on the template matching.

The template setting unit 12 passes the template to the search region setting unit 13 and the sub-templates to the matching unit 14. Further, for each sub-template containing a portion other than the fingertip portion, the template setting unit 12 notifies the fingertip position computing unit 15 of the coordinates representing the center of the finger region contained in the sub-template.

The search region setting unit 13 sets, for each sub-template, a corresponding search region in the image acquired from the other camera (in the present embodiment, the camera 4-2). Among the images generated by the camera 4-2, the image whose capture time is closest to the capture time of the image captured by the camera 4-1 and used to generate the sub-template is taken by the search region setting unit 13 as the image in which the search region is to be set.

To set the search region, the search region setting unit 13 performs template matching between the template and the other image. In this case, the search region setting unit 13 computes normalized cross-correlation values between the template and the other image while, for example, shifting the position of the template relative to the other image in the horizontal direction (i.e., in the parallax direction). The search region setting unit 13 may also shift the position of the template relative to the other image in the vertical direction. Then, the search region setting unit 13 takes the location of the template that yielded the maximum normalized cross-correlation value on the other image as a reference region for determining the search region. Since the search region setting unit 13 can identify the region that matches the template on the other image by using a wide area defined by the finger region, the chance of erroneously taking a region containing an object other than the finger as the search region can be reduced.

When the template and sub-templates are generated by the template setting unit 12 after applying an affine transformation to the image so that the longitudinal direction of the finger region becomes the vertical direction, the search region setting unit 13 also applies an affine transformation to the other image so that the longitudinal direction of the finger becomes the vertical direction. Then, the search region setting unit 13 uses the other image after the affine transformation for template matching. In this case, the search region setting unit 13 rotates the other image by an angle equal to the angle that the template setting unit 12 has obtained between the longitudinal direction of the finger region and the vertical direction of the image.

When an input operation is performed by the user touching the object 8 with the fingertip, the fingertip is considered to be located farther from the cameras 4-1 and 4-2 than the base of the finger is, because of the positional relationship of the cameras 4-1 and 4-2 to the object 8 and the finger. Further, in the present embodiment, since the cameras 4-1 and 4-2 are both set so as to be directed in the same direction, the parallax between the cameras 4-1 and 4-2 decreases with increasing distance from the cameras 4-1 and 4-2.

In view of the above, the search region setting unit 13 equally divides the reference region into search regions equal in number to the sub-templates along the same direction as the direction along which the template was divided, i.e., along the longitudinal direction of the finger region. Then, the search region setting unit 13 sets each search region so that, as the corresponding sub-template is located closer to the fingertip, the width of the search region measured in the direction orthogonal to the longitudinal direction of the finger region becomes larger than the corresponding width of the reference region, by expanding the width of the search region in a direction in which the parallax decreases. The width of the search region in the direction orthogonal to the longitudinal direction of the finger region is hereinafter simply referred to as the width of the search region. Conversely, the search region setting unit 13 sets each search region so that, as the sub-template is located closer to the base of the finger, the width of the search region corresponding to the sub-template becomes larger by expanding the width in a direction in which the parallax increases. This increases the chance that the portion that best matches the finger region contained in the sub-template is contained in the search region. On the other hand, since the search region is not expanded when the chance of containing the portion that best matches the finger region is small, the search region setting unit 13 can reduce the chance of erroneously detecting a portion other than the finger region as the portion that best matches the finger region.

Figure 7:
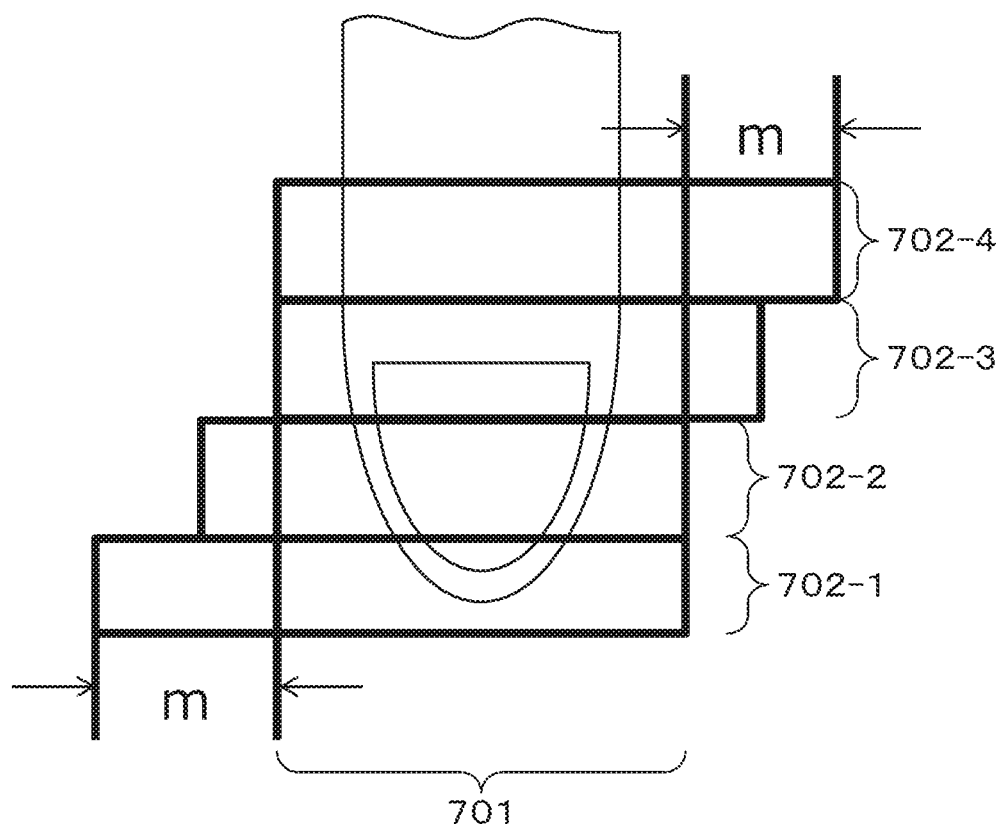
FIG. 7 is a diagram illustrating one example of how search regions are set for the sub-templates depicted in FIG. 6.

FIG. 7 is a diagram illustrating one example of how the search regions are set for the sub-templates depicted in FIG. 6. As earlier noted, the direction of the parallax between the cameras 4-1 and 4-2 is the horizontal direction in the image generated by the camera 4-2. As a result, the larger the parallax for the same subject, the larger the displacement between the horizontal position on the image captured by the camera 4-1 and the corresponding horizontal position on the image captured by the camera 4-2. Therefore, in the illustrated example, compared with the width of the reference region 701 detected in the image, the width of the search region 702-1 corresponding to the sub-template closest to the fingertip (the sub-template 602-1 in FIG. 6) is expanded by m pixels in a direction toward the horizontal position of the corresponding sub-template. Likewise, compared with the width of the reference region 701, the width of the search region 702-2 corresponding to the sub-template next closest to the fingertip (the sub-template 602-2 in FIG. 6) is expanded by m/2 pixels in a direction toward the horizontal position of the corresponding sub-template. Conversely, compared with the width of the reference region 701, the width of the search region 702-3 corresponding to the sub-template next farthest from the fingertip (the sub-template 602-3 in FIG. 6) is expanded by m/2 pixels in a direction away from the horizontal position of the corresponding sub-template. Further, compared with the width of the reference region 701, the width of the search region 702-4 corresponding to the sub-template farthest from the fingertip (the sub-template 602-4 in FIG. 6) is expanded by m pixels in a direction away from the horizontal position of the corresponding sub-template.

In the illustrated example, m is determined, for example, according to the vertical length H of the template, and is set equal to the number of pixels, for example, 5, corresponding to the amount of displacement that can occur in the image for the maximum value of the parallax according to the length of the finger portion in real space that corresponds to the length H in the template.

According to a modified example, the search region setting unit 13 may expand the width of every one of the search regions by the same number of pixels in at least one of the leftward and rightward directions with respect to the reference region. Alternatively, the search region setting unit 13 may equally divide the reference region into sub-regions equal in number to the sub-templates along the same direction as the direction along which the template was divided, and may set these sub-regions directly as the search regions.

The search region setting unit 13 reports each search region to the matching unit 14.

The matching unit 14 performs template matching between each sub-template and the corresponding search region to detect the best matching position for the sub-template, thus detecting in the other image the matching point that corresponds to the finger portion contained in the sub-template. More specifically, the matching unit 14 computes normalized cross-correlation values between the sub-template and the search region while, for example, shifting the position of the sub-template relative to the search region in the horizontal direction. Then, for each sub-template, the matching unit 14 obtains the location of the sub-template on the search region where the maximum normalized cross-correlation value is generated. For the sub-template containing the fingertip, the matching unit 14 obtains the matching point position Q1 (x1, y1) on the search region that corresponds to the fingertip position P(px, py) on the sub-template when the sub-template is aligned with the location on the search region where the maximum normalized cross-correlation value is generated. Likewise, for each of the other sub-templates, the matching unit 14 obtains the matching point position Qi (xi, yi) (i=2, 3, . . . , N) on the search region that corresponds to the center position of the finger region contained in the sub-template.

The matching unit 14 notifies the fingertip position computing unit 15 of the matching point position Qi obtained for each sub-template.

The fingertip position computing unit 15 computes the fingertip position in real space, based on the position of the finger portion contained in each sub-template on the image captured by the camera 4-1 and the matching point position on the image captured by the camera 4-2.

In the present embodiment, since the mounting position, the angle of view, and the resolution of each camera are known, the fingertip position computing unit 15 can compute the position of any designated portion of the finger in real space by triangulation from the position of the designated portion on one image and the matching point position on the other image. For example, based on the fingertip position obtained from the sub-template containing the fingertip and the matching point corresponding to the fingertip position, the fingertip position computing unit 15 computes the distance Z from the camera 4-1 (or the camera 4-2) to the fingertip position along the optical axis of the camera 4-1 in accordance with the following equation.

$$Z = \frac{f \cdot T}{x0 - x1} \quad (3)$$

where x0 is the horizontal coordinate of the fingertip position on one image, and x1 is the horizontal coordinate of the matching point on the other image. Further, f denotes the focal length of the cameras 4-1 and 4-2. T represents the distance between the two cameras 4-1 and 4-2.

The pixel position on the image has a one-to-one correspondence with the angle it makes with the optical axis of the camera. Therefore, based on the distance from the camera 4-1 to the fingertip and the angle relative to the optical axis that corresponds to the fingertip position on the image, the fingertip position computing unit 15 can identify the fingertip position on a plane orthogonal to the optical axis of the camera 4-1.

When the user touches the object 8 with the finger, it is assumed that the finger portion near the fingertip is stretched straight. Therefore, in the present embodiment, based on the finger portion corresponding to the center of the finger region contained in each sub-template and the position of the matching point on the image, the fingertip position computing unit 15 computes the position of the finger portion in real space in accordance with the equation (3). Then, the fingertip position computing unit 15 computes the distance between the camera 4-1 and the fingertip position by linearly approximating between the position of the finger portion corresponding to each sub-template and the position of the fingertip in real space.

Figure 8:
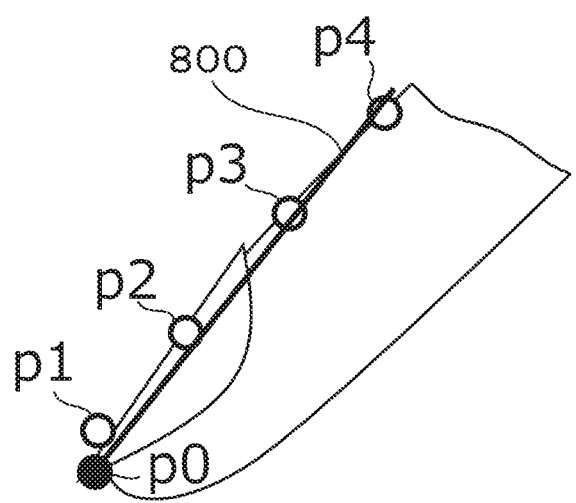
FIG. 8 is a diagram illustrating one example of how fingertip position is computed by linear approximation.

FIG. 8 is a diagram illustrating one example of how the fingertip position is computed by linear approximation. In the illustrated example, P1 indicates the position of the fingertip in real space obtained for the sub-template containing the fingertip position, and P2 to P4 respectively indicate the positions of the finger portion in real space obtained for the other sub-templates. The fingertip position computing unit 15 obtains a linearly approximated line 800 by applying, for example, a least squares method to P1 to P4. Then, the fingertip position computing unit 15 determines that the position P0 on the straight line 800 where its horizontal coordinate coincides with the horizontal coordinate of the point P1, i.e., the position at the end of the straight line 800 farthest from the camera 4-1, is the real fingertip position. Then, the fingertip position computing unit 15 determines that the distance from the camera 4-1 to the position P0 is the distance from the camera 4-1 to the fingertip position. The fingertip position computing unit 15 notifies the contact/noncontact determining unit 16 of the position of the fingertip in real space.

The contact/noncontact determining unit 16 compares the distance from the camera 4-1 to the fingertip position with the distance between the camera 4-1 and the object 8 corresponding to the position of the fingertip. When the difference between the distances is not larger than a predetermined contact/noncontact determining threshold value corresponding to the thickness of the finger, the contact/noncontact determining unit 16 determines that the fingertip has touched the object 8.

When it is determined that the fingertip has touched the object 8, the contact/noncontact determining unit 16 produces an input signal corresponding to the position of the fingertip on the surface of the object 8, and transmits the input signal to another apparatus via the communication unit 5. Alternatively, the control unit 7 may perform processing appropriate to the input signal.

Figure 9A:
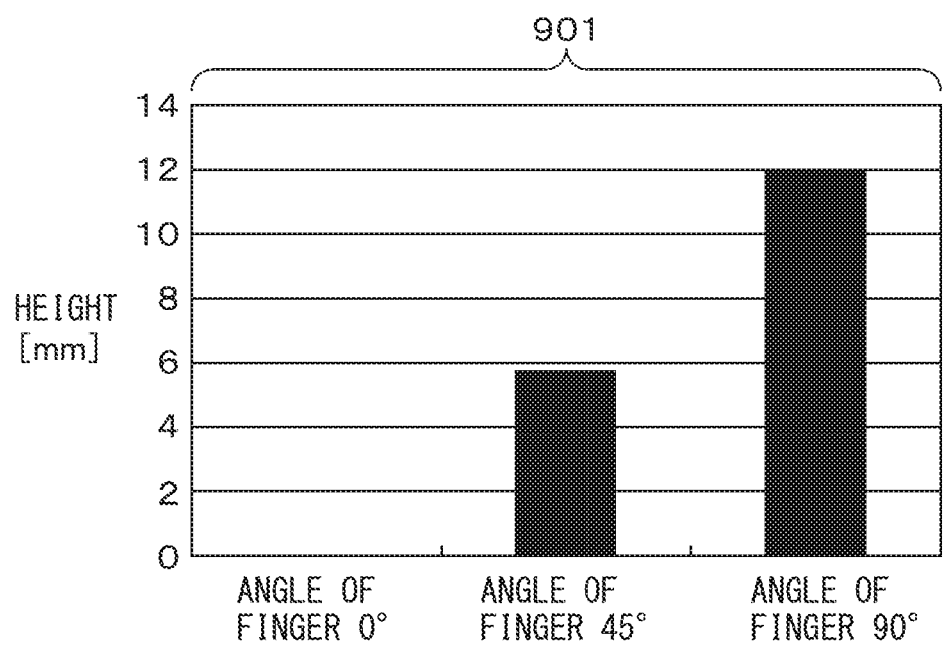
FIG. 9A is a diagram illustrating, as a comparative example, the results of the computation performed using the template itself to obtain the height from the object to the fingertip in an image captured of the finger when the fingertip is in contact with the object.
Figure 9B:
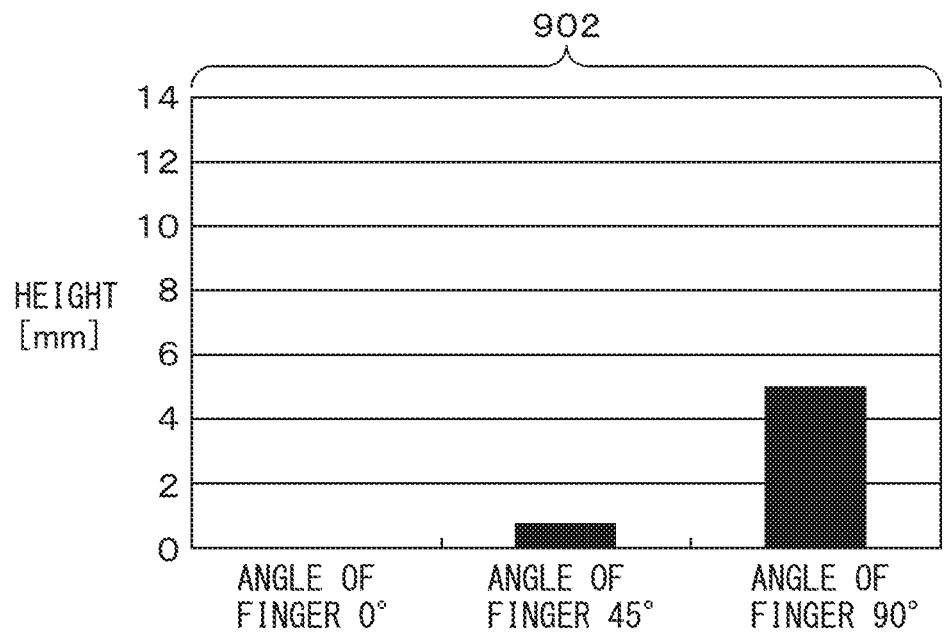
FIG. 9B is a diagram illustrating the results of the computation performed using two sub-templates, generated by dividing the template, to obtain the height from the object to the fingertip in an image captured of the finger when the fingertip is in contact with the object.

FIG. 9A is a diagram illustrating, as a comparative example, the results of the computation performed using the template itself to obtain the height from the object to the fingertip in an image captured of the finger when the fingertip is in contact with the object. On the other hand, FIG. 9B is a diagram illustrating the results of the computation performed using two sub-templates, generated by dividing the template, to obtain the height from the object to the fingertip in an image captured of the finger when the fingertip is in contact with the object. In FIGS. 9A and 9B, the horizontal axis represents the angle of the finger relative to the object, and the vertical axis represents errors occurring in the computation of the height from the object to the fingertip, i.e., the fingertip position in the height direction. Bar graphs 901 in FIG. 9A each represent the relationship between the angle of the finger relative to the object and the computed value of the height from the object to the fingertip when the template itself is used. On the other hand, bar graphs 902 in FIG. 9B each represent the relationship between the angle of the finger relative to the object and the computed value of the height from the object to the fingertip when the two sub-templates generated by dividing the template are used. As can be seen from the bar graphs 901 and 902, the error in the computation of the fingertip position in the height direction is reduced according to the fingertip position detection process of the present embodiment.

FIG. 10 is an operation flowchart illustrating the input process incorporating the fingertip position detection process. Each time images are acquired from the cameras 4-1 and 4-2, the control unit 7 executes the input process in accordance with the following operation flowchart. In the following operation flowchart, the process from step S101 to step S110 corresponds to the fingertip position detection process.

The finger region detection unit 11 detects the finger region containing the finger from the image captured by the camera 4-1 (step S101). Then, the finger region detection unit 11 detects the fingertip position on the image by detecting the distal end of the finger region (step S102).

The template setting unit 12 sets the template so as to contain a portion of the finger region, including the fingertip position on the image (step S103). Further, the template setting unit 12 divides the template into a plurality of sub-templates along the longitudinal direction of the finger region (step S104).

The search region setting unit 13 performs template matching between the template and the other image (i.e., the image captured by the camera 4-2), and detects as a reference region the region that best matches the template within the other image (step S105).

The search region setting unit 13 divides the reference region into search regions equal in number to the sub-templates along the longitudinal direction of the finger region (step S106). Then, the search region setting unit 13 sets each search region so that the width of the search region corresponding to the sub-template closer to the fingertip is expanded in a direction that decreases the parallax (step S107).

The matching unit 14 performs template matching between each sub-template and its corresponding search region and detects within the corresponding search region the matching point that corresponds to the fingertip position or the finger portion corresponding to the center of the finger region in the sub-template (step S108).

The fingertip position computing unit 15 computes the position of the fingertip in real space, based on the fingertip position and its matching point, and computes the position of the finger portion in real space, based on the finger portion corresponding to the center of the finger region in the sub-template and its matching point (step S109). Then, the fingertip position computing unit 15 updates the fingertip position in real space with the fingertip position in real space that is obtained by linearly approximating between the position of the fingertip in real space and the positions of the respective finger portions in real space (step S110).

The contact/noncontact determining unit 16 determines whether the difference between the distance from the camera 4-1 to the object 8 at the fingertip position and the distance from the camera 4-1 to the fingertip lies within the contact/noncontact determining threshold D (step S111). When the difference is larger than the contact/noncontact determining threshold D (No in step S111), the contact/noncontact determining unit 16 determines that the user's finger is not in contact with the object 8. Then, the control unit 7 terminates the input process.

On the other hand, when the difference lies within the contact/noncontact determining threshold D (Yes in step S111), the contact/noncontact determining unit 16 determines that the user's finger has touched the object 8 at the fingertip position. Then, the contact/noncontact determining unit 16 produces an input signal corresponding to the coordinates of the fingertip position in real space, and outputs the input signal (step S112). Then, the control unit 7 terminates the input process.

As has been described above, the input apparatus generates a plurality of sub-templates by dividing the template containing the finger region detected from one image into the sub-templates along the longitudinal direction of the finger region. Then, for each sub-template, the input apparatus detects within the search region in the other image the matching point that corresponds to the finger portion contained in the sub-template. Then, based on the finger portion and its matching point detected for each sub-template, the input apparatus obtains the position of the finger portion in real space and, by linearly approximating between such positions, computes the position of the fingertip in real space. Since this serves to reduce the effects that the finger portions other than the fingertip can have when determining the fingertip position, the input apparatus can identify the position of the fingertip in real space with higher accuracy.

According to a modified example, the fingertip position computing unit 15 may not use linear approximation to compute the fingertip position in real space but may use the fingertip position in real space computed based on the sub-template containing the fingertip directly as the fingertip position in real space. In this case, since the matching unit 14 need not perform template matching for any sub-template that does not contain the fingertip position, the amount of computation can be reduced.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of superiority and inferiority of the invention. Although the embodiments of the present invention have been described in detail, it should be understood that the various changes, substitutions, and alterations could be made hereto without departing from the spirit and scope of the invention.

What is claimed is:

1. An input apparatus comprising:
    a first camera which captures a finger and generates a first image representing the finger;
    a second camera which is placed a prescribed distance away from the first camera, and which captures the finger and generates a second image representing the finger;
    a processor configured to: detect, from the first image, a finger region containing the finger and detects, from the finger region, a fingertip position corresponding to a fingertip of the finger;
    set a template containing the finger region;
    generate a plurality of sub-templates by dividing the template along a longitudinal direction of the finger region;
    obtain a region that best matches the template on the second image, and which divides the region into search regions equal in number to the sub-templates along the longitudinal direction of the finger region;
    perform template matching between a sub-template selected from among the plurality of sub-templates as containing the fingertip position and a corresponding one of the search regions to find a matching point on the second image that corresponds to the fingertip position on the first image; and
    compute the position of the fingertip of the finger in real space, based on the fingertip position on the first image and the matching point on the second image.

2. The input apparatus according to claim 1, wherein the generating the plurality of sub-templates expands the width of the search region corresponding to the sub-template among the plurality of sub-templates as containing the fingertip position in the direction orthogonal to the longitudinal direction of the finger region so that the width of the search region becomes larger in a direction in which parallax between the first camera and the second camera decreases.

3. The input apparatus according to claim 1, wherein the performing the template matching performs, for each sub-template among the plurality of sub-templates as not containing the fingertip position, template matching between the sub-template and a corresponding one of the search regions to find a matching point on the second image that corresponds to a point within the finger region contained in the sub-template, and
    the computing the position of the fingertip computes, for each sub-template among the plurality of sub-templates as not containing the fingertip position, based on the matching point and the point within the finger region contained in the sub-template, the position of the point in real space, obtains a straight line by linearly approximating between the computed position of the point in real space and the position of the fingertip of the finger in real space computed based on the sub-template containing the fingertip position, and determines that the position of an end of the straight line farthest from the first camera represents the position of the fingertip of the finger in real space.

4. The input apparatus according to claim 3, wherein the generating the plurality of sub-templates expands, for each sub-template selected from among the plurality of sub-templates as not containing the fingertip position, the width of the search region corresponding to the sub-template in a direction orthogonal to the longitudinal direction of the finger region so that, as the sub-template is located closer to a base of the finger, the width of the corresponding search region becomes larger in a direction in which parallax between the first camera and the second camera increases.

5. The input apparatus according to claim 1, wherein the processor further configured to determine that the finger is in contact with the object, when the difference between the distance from the first camera or the second camera to the position of the fingertip of the finger in real space and the distance from the first camera or the second camera to an object lies within a predetermined threshold and produce an input signal corresponding to the position of the fingertip of the finger in real space.

6. A fingertip position detection method comprising:
    detecting, by a processor, from a first image of a finger generated by a first camera by capturing the finger, a finger region containing the finger and to detect, from the finger region, a fingertip position corresponding to a fingertip of the finger;
    setting, by the processor, a template containing the finger region;
    generating, by the processor, a plurality of sub-templates by dividing the template along a longitudinal direction of the finger region;
    obtaining, by the processor, a region that best matches the template on a second image of the finger generated by capturing the finger by a second camera placed a prescribed distance away from the first camera and to divide the region into search regions equal in number to the sub-templates along the longitudinal direction of the finger region;
    performing, by the processor, template matching between a sub-template selected from among the plurality of sub-templates as containing the fingertip position and a corresponding one of the search regions to find a matching point on the second image that corresponds to the fingertip position on the first image; and
    computing, by the processor, the position of the fingertip of the finger in real space, based on the fingertip position on the first image and the matching point on the second image.

7. The fingertip position detection method according to claim 6, wherein the generating the plurality of sub-templates expands the width of the search region corresponding to the sub-template among the plurality of sub-templates as containing the fingertip position in the direction orthogonal to the longitudinal direction of the finger region so that the width of the search region becomes larger in a direction in which parallax between the first camera and the second camera decreases.

8. The fingertip position detection method according to claim 6, wherein the performing the template matching performs, for each sub-template among the plurality of sub-templates as not containing the fingertip position, template matching between the sub-template and a corresponding one of the search regions to find a matching point on the second image that corresponds to a point within the finger region contained in the sub-template, and the computing the position of the fingertip computes, for each sub-template among the plurality of sub-templates as not containing the fingertip position, based on the matching point and the point within the finger region contained in the sub-template, the position of the point in real space, obtains a straight line by linearly approximating between the computed position of the point in real space and the position of the fingertip of the finger in real space computed based on the sub-template containing the fingertip position, and determines that the position of an end of the straight line farthest from the first camera represents the position of the fingertip of the finger in real space.

9. The fingertip position detection method according to claim 8, wherein the generating the plurality of sub-templates expands, for each sub-template selected from among the plurality of sub-templates as not containing the fingertip position, the width of the search region corresponding to the sub-template in a direction orthogonal to the longitudinal direction of the finger region so that, as the sub-template is located closer to a base of the finger, the width of the corresponding search region becomes larger in a direction in which parallax between the first camera and the second camera increases.

10. The fingertip position detection method according to claim 6, further comprising:

determining that the finger is in contact with the object, by the processor, when the difference between the distance from the first camera or the second camera to the position of the fingertip of the finger in real space and the distance from the first camera or the second camera to an object lies within a predetermined threshold and producing an input signal corresponding to the position of the fingertip of the finger in real space.

11. A non-transitory computer-readable recording medium having recorded thereon a fingertip position detection computer program that causes a computer to execute a process comprising:

detecting, from a first image of a finger generated by a first camera by capturing the finger, a finger region containing the finger and detecting, from the finger region, a fingertip position corresponding to a fingertip of the finger;

setting a template containing the finger region;

generating a plurality of sub-templates by dividing the template along a longitudinal direction of the finger region;

obtaining a region that best matches the template on a second image of the finger generated by capturing the finger by a second camera placed a prescribed distance away from the first camera, and dividing the region into search regions equal in number to the sub-templates along the longitudinal direction of the finger region;

performing template matching between a sub-template selected from among the plurality of sub-templates as containing the fingertip position and a corresponding one of the search regions to find a matching point on the second image that corresponds to the fingertip position on the first image; and computing the position of the fingertip of the finger in real space, based on the fingertip position on the first image and the matching point on the second image.

* * * * *